(12) United States Patent
Takashima et al.

(10) Patent No.: US 12,100,179 B2
(45) Date of Patent: Sep. 24, 2024

(54) INFORMATION PROCESSING SYSTEM, METHOD, AND PROGRAM (71) Applicant: Furuno Electric Co., Ltd., Hyogo (JP)

(72) Inventors: Yuya Takashima, Nishinomiya (JP); Masahiro Minowa, Nishinomiya (JP); Shigeaki Okumura, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 379 days.

(21) Appl. No.: 17/456,555

(22) Filed: Nov. 24, 2021

(65) Prior Publication Data

US 2022/0084242 A1 Mar. 17, 2022

Related U.S. Application Data (63) Continuation of application No. PCT/JP2020/017360, filed on Apr. 22, 2020.

(30) Foreign Application Priority Data

May 29, 2019 (JP) ................................. 2019-100413

(51) Int. Cl.
G06K 9/00 (2022.01)
G06T 7/73 (2017.01)
G06V 10/24 (2022.01)

(52) U.S. Cl.
CPC ................ G06T 7/74 (2017.01); G06V 10/24 (2022.01); G06T 2207/20224 (2013.01); G06T 2207/30181 (2013.01)

(58) Field of Classification Search
CPC ............. G06T 7/74; G06T 2207/20224; G06T 2207/30181; G06V 10/24
See application file for complete search history.

(56) References Cited

U.S. PATENT DOCUMENTS 8,390,696 B2 * 3/2013 Komoto ............... H04N 25/134
348/222.1
10,036,634 B2 * 7/2018 Callahan ................ H04N 7/185
(Continued)

FOREIGN PATENT DOCUMENTS

CN 103776427 A 5/2014
CN 105872362 A 8/2016
(Continued)

OTHER PUBLICATIONS

What Do the Sun and the Sky Tell Us About the Camera?, Jean-François Lalonde et al., Springer, 2010, pp. 24-51 (Year: 2010).*

(Continued)

*Primary Examiner* — Jayesh A Patel
(74) *Attorney, Agent, or Firm* — Alleman Hall & Tuttle LLP (57) ABSTRACT

An imaging processing device includes an image acquisition module configured to acquire an image obtained by photographing the sky with a camera having a known orientation or slant; a time stamp acquisition module configured to acquire a photographing date and time of the image; a photographing position acquisition module configured to acquire position information of a photographing position of the image; a sun position determination module configured to determine a photographed sun position in the image; a reference sun position acquisition module configured to calculate a reference sun position indicating a sun position determined based on the photographing date and time and the position information; and a camera information identification module configured to determine any one of unknown orientation and slant of the camera based on any one of the known orientation and slant of the camera, the photographed sun position, and the reference sun position.

21 Claims, 10 Drawing Sheets

(56) References Cited

U.S. PATENT DOCUMENTS

| | | |
|---|---|---|
| 2004/0120551 A1 | 6/2004 | Turner |
| 2005/0043866 A1 | 2/2005 | Litchfield et al. |
| 2012/0206614 A1* | 8/2012 | Molgaard ............ H04N 1/4092 |
| | | 348/208.4 |
| 2012/0257084 A1* | 10/2012 | Kiyoshige ............ H04N 23/635 |
| | | 348/231.5 |
| 2014/0022539 A1 | 1/2014 | France |
| 2015/0226827 A1* | 8/2015 | Aycock ................. G06V 20/00 |
| | | 382/103 |
| 2017/0026568 A1* | 1/2017 | Haehnichen ............ G08B 3/10 |
| 2017/0154233 A1* | 6/2017 | Gallagher ............. G01C 17/34 |
| 2017/0201678 A1 | 7/2017 | Lv |
| 2020/0393688 A1* | 12/2020 | Sheldon ................ H04N 23/81 |
| 2021/0110565 A1* | 4/2021 | Takashima ................ G06T 3/40 |

FOREIGN PATENT DOCUMENTS

| | | | | |
|---|---|---|---|---|
| CN | 106441310 A | | 2/2017 | |
| CN | 106537409 A | | 3/2017 | |
| CN | 108476288 A | * | 8/2018 | ........... B64C 39/024 |
| CN | 112292620 A | | 1/2021 | |
| CN | 115655249 A | | 1/2023 | |
| EP | 2375755 A1 | * | 10/2011 | ........... H04N 5/2251 |
| JP | H09318383 A | | 12/1997 | |
| JP | H11257949 A | | 9/1999 | |
| JP | 2003329780 A | | 11/2003 | |
| JP | 2004117478 A | | 4/2004 | |
| JP | 2005331320 A | | 12/2005 | |
| JP | 2009282406 A | | 12/2009 | |
| KR | 101313282 B1 | | 9/2013 | |
| WO | 2010079557 A1 | | 7/2010 | |
| WO | 2015108591 A2 | | 7/2015 | |

OTHER PUBLICATIONS

Camera Parameters Estimation from Hand-labelled Sun Sositions in Image Sequences, Jean-Fran,cois Lalonde et al., CMU-RI-TR-08-32, 2008, pp. 1-15 (Year: 2008).*

Sky camera geometric calibration using solar observations. Bryan Urquhart et al., EGU, 2016, pp. 4279-4294 (Year: 2016).*

Beyond GPS: Determining the Camera Viewing Direction of a Geotagged Image, Minwoo Park et al., ACM, 2010, pp. 631-634 (Year: 2010).*

Accuracy of Sea Ice Floe Size Observation from an Aerial Camera at Slant Angles, Christopher Dahlin Rodin et al., IEEE, 2017, pp. 216-221 (Year: 2017).*

European Patent Office, Extended European Search Report Issued in Application No. 20814580.5, Jul. 20, 2023, Germany, 12 pages.

Urquhart, B. et al., "Sky camera geometric calibration using solar observations," Atmospheric Measurement Techniques, vol. 9, No. 9, Jan. 15, 2016, 16 pages.

ISA Japan Patent Office, International Search Report Issued in Application No. PCT/JP2020/017360, Aug. 4, 2020, WIPO, 4 pages.

Miyazaki, D., et al., "Estimating Sunlight Polarization Using a Fish-eye Lens," IPSJ Transactions on Computer Vision and Applications, vol. 1, Dec. 14, 2009, 13 pages.

Román, R. et al., "Calibration of an all-sky camera for obtaining sky radiance at three wavelengths," Atmospheric Measurement Techniques, vol. 5, No. 8, Feb. 23, 2012, 12 pages.

China National Intellectual Property Administration, Office Action and Search Report Issued in Application No. 202080039795.0, Dec. 7, 2023, 13 pages.

Zhang, C. et al., "Computation for solar real-time position and its application in illuminant direction of image," Electronic Measurement Technology, vol. 33, No. 11, Nov. 15, 2010, 4 pages.

* cited by examiner

Camera slant (known): Horizontal

Camera slant (known): Horizontal

FIG. 5

Camera slant (known): Non-Horizontal

Correction

Camera slant (known):
Non-Horizontal

FIG. 6

Correction

FIG. 7

Camera slant: unknown
Camera orientation: known (south is at bottom side of the image)

FIG. 8

Camera slant: unknown
Camera orientation: known (south is at bottom side of the image)

INFORMATION PROCESSING SYSTEM, METHOD, AND PROGRAM

CROSS-REFERENCE TO RELATED APPLICATION(S)

This application is a continuation of PCT International Application No. PCT/JP2020/017360, which was filed on Apr. 22, 2020, and which claims priority to Japanese patent Application No. 2019-100413 filed on May 29, 2019, the entire disclosures of each of which are herein incorporated by reference for all purposes.

TECHNICAL FIELD

The present disclosure relates to an information processing system (device), method, and program for determining the orientation or slant of a camera used for cloud observation.

BACKGROUND

For conventional cloud observation, satellites are mainly used. Since satellites observe clouds from above, they cannot obtain detailed distribution of clouds near the ground. Therefore, an amount and duration of sunlight on the ground cannot be grasped.

As an alternative to satellites, it is known to use a camera such as a whole-sky camera installed on the ground. It is conceivable that the cameras are installed in measurement zones spaced apart from each other and observe the same cloud using images from a plurality of cameras.

Patent Document 1 WO 2010/079557

SUMMARY

In such cloud observation by a plurality of cameras, it is necessary that the orientation and slant of each camera coincide with each other with high accuracy. Further, even in the cloud observation by a single camera, if the orientation and slant of the camera do not coincide with each other accurately, an error is included in the orientation of the cloud reflected in the obtained image. If the orientation of the cloud includes an error, it is difficult to obtain a desired accuracy when the solar radiation amount is estimated based on the movement of the cloud by taking in external data such as wind velocity.

International Patent Publication No. WO 2010/079557 (Patent Document 1) describes a device for detecting the orientation of a camera, but not a whole-sky camera. However, this method requires a deflection camera.

If an attitude sensor or an orientation sensor is mounted, the orientation and slant of the camera can be obtained, but an extra sensor is required.

Further, although it is possible to prevent the deterioration of accuracy by carrying out strict orientation alignment and slant alignment when installing the camera, the installation work of the camera becomes troublesome.

It is an object of the present disclosure to provide an information processing device, method, and program capable of determining the orientation or slant of a camera while facilitating the installation work of the camera and reducing the number of sensors provided in the camera.

An information processing device of the present disclosure includes:

an image acquisition module configured to acquire an image obtained by photographing the sky with a camera having a known orientation or slant;
a photographing time stamp acquisition module configured to acquire a photographing date and time of the image;
a photographing position acquisition module configured to acquire position information of a photographing position of the image;
a sun position determination module configured to determine a photographed sun position indicating a sun position in the image;
a reference sun position acquisition module configured to calculate a reference sun position indicating a position of the sun determined based on the photographing date and time and the position information; and a camera information identification module configured to determine any one of unknown orientation and slant of the camera based on any one of known orientation and slant of the camera (vice versa), the photographed sun position, and the reference sun position.

An information processing device includes:
processing circuitry configured
to acquire an image obtained by photographing the sky with a camera having a known orientation or slant;
to acquire a photographing date and time of the image;
to acquire position information of a photographing position of the image;
to determine a photographed sun position indicating a sun position in the image;
to calculate a reference sun position indicating a position of the sun determined based on the photographing date and time and the position information; and
to determine any one of unknown orientation and slant of the camera based on any one of known orientation and slant of the camera, the photographed sun position, and the reference sun position.

According to this configuration, if any one of the orientation and the slant of the camera is known, any one of the unknown orientation and the unknown slant of the camera can be determined based on the photographing date and time, the position information of the photographing position (for example, latitude and longitude), and the sun position reflected in the image. Therefore, it becomes unnecessary to align the orientation or the slant when the camera is installed, and it becomes possible to specify the slant or the orientation of the camera without providing an attitude sensor or an orientation sensor.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein:

DETAILED DESCRIPTION

An information processing device 1 according to a first embodiment of the present disclosure will be described below with reference to the drawings.

Figure 3:
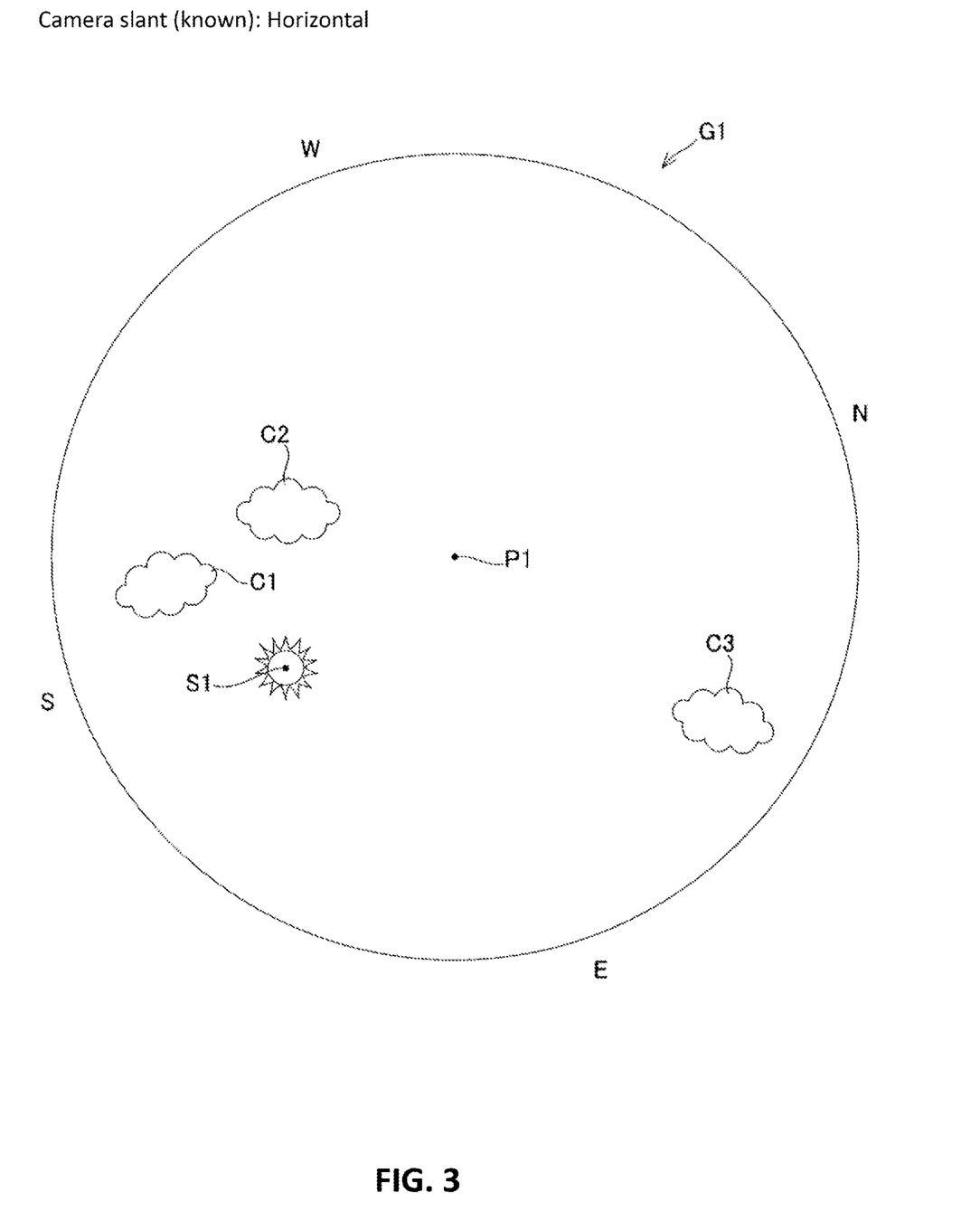
FIG. 3 an illustration of an image of the sky taken by a horizontally positioned camera with a known slant in the first embodiment.

The information processing device 1 of the first embodiment is used for an observation system. The observation system includes one or more cameras 10 for photographing the sky and a computer for processing images photographed by the cameras 10. The information processing device 1 acquires an image obtained by photographing the sky with a camera 10 whose slant is known, and determines an unknown direction of the camera as camera information based on the image. The camera 10 for photographing the image acquired by the information processing device 1 may be any camera as long as it can photograph the sky. In this embodiment, a whole-sky camera using a fisheye lens is installed upward in order to photograph a wide area of the sky with one camera. In the example of FIG. 3, since the camera 10 is installed so as to be horizontally upward in a vertical direction, a center P1 of an image G1 obtained from the camera 10 becomes straight up (Elevation angle 90°), and an elevation angle decreases from the center toward the end of the image G1. The orientation (slant) of the camera 10 can be expressed by a roll angle and a pitch angle with respect to a roll axis and a pitch axis orthogonal to each other in a horizontal plane. The orientation of the camera 10 can be expressed by a yaw angle with respect to a yaw axis parallel to the vertical direction.

Figure 1:
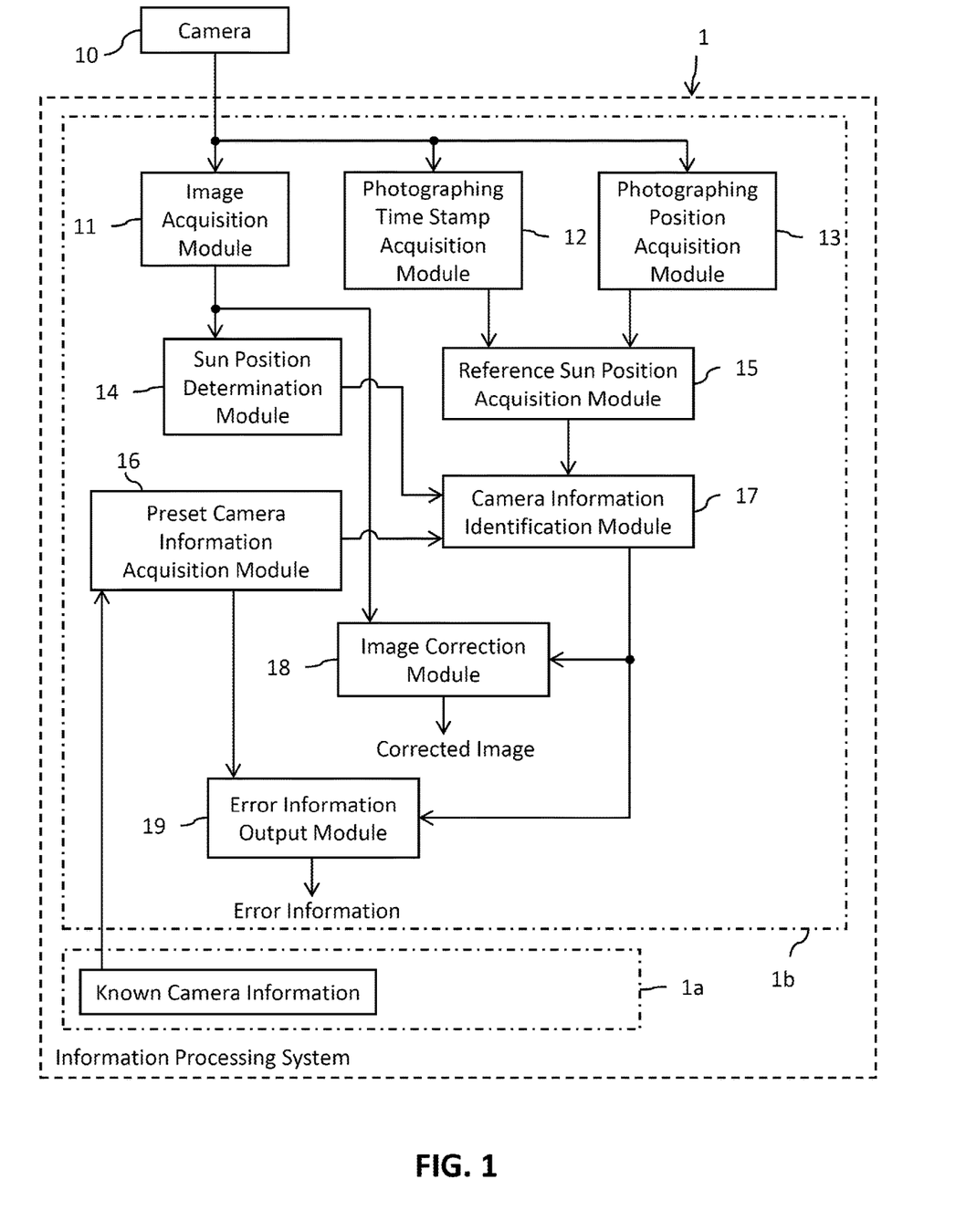
FIG. 1 is a block diagram showing a configuration of an information processing device according to the first and second embodiments of the present disclosure.

As shown in FIG. 1, the information processing device 1 of the first embodiment includes an image acquisition module 11, a photographing time stamp acquisition module 12, a photographing position acquisition module 13, a sun position determination module 14, a reference sun position acquisition module 15, a preset camera information acquisition module 16, and a camera information identification module 17. The respective modules 11-17 are realized in cooperation of software and hardware by executing a program previously stored in a memory by a processor 1b (processing circuitry) in a computer including the processor 1b such as a CPU, a storage 1a such as a memory, various interfaces, etc.

As shown in FIG. 3, the image acquisition module 11 shown in FIG. 1 acquires the image G1 obtained by photographing the sky by the camera 10. In the example of FIG. 3, the center P1 of the image G1 is directly above, and clouds (C1, C2, C3) and the sun (S1) are reflected. In the figure, the directions of north, south, east, and west are represented by E, W, S, and N, but the directions are originally unknown in only one image G1. Incidentally, it is preferable to install the camera 10 while deciding the direction of the camera 10 so that the bottom side of the image photographed by the camera 10 becomes the reference orientation [for example, south (S)]. However, it is conceivable that the installation work of the camera 10 is complicated, an error occurs, or the orientation of the camera 10 cannot be adjusted when the camera 10 is installed on the wall surface of a building.

The photographing time stamp acquisition module 12 shown in FIG. 1 acquires the photographing date and time of the image G1 acquired by the image acquisition module 11. The photographing position acquisition module 13 acquires position information (latitude, longitude) of a photographing position of the image G1 acquired by the image acquisition module 11. The photographing date/photographing time stamp acquisition module 12 and the photographing position acquisition module 13 may acquire the photographing date and time and the photographing position from meta tag data embedded in the image G1, or may be configured to acquire the photographing date and time and the photographing position based on data from the camera 10. The photographing position acquisition module 13 may be configured to receive a camera identifier (ID) from the camera 10 and acquire an installation position corresponding to the camera ID as the photographing position from the existing camera information database having the installation position of the camera 10.

The sun position determination module 14 shown in FIG. 1 determines a photographed sun position S1 indicating the sun position in the image G1. In this embodiment, since the sun is the strongest light source in the natural world, a coordinate center of the maximum luminance value in the image G1 is determined as the photographed sun position S1. At this time, in order to improve an accuracy of determining the photographed sun position S1 by reducing the white jump area due to the sun, photographing is performed with less exposure than the exposure at the time of observation used at the time of observation. As a standard, it is preferable to make the whole of the photographed image G1 dark and to make the exposure in which only the sun shines. In order to reduce the exposure, the shutter speed may be made higher during observation, or the aperture value may be made larger than during observation. Another method for identifying the position of the photographed sun is to determine that the sun is a region radially extending from a center point of a pixel group having the maximum luminance in the image G1, in which the luminance gradually decreases without pulsation as the distance from the center point increases, and in which the pulsation of the luminance starts. Of course, the method of determining the sun is not limited to this, and various methods may be employed.

Figure 4:
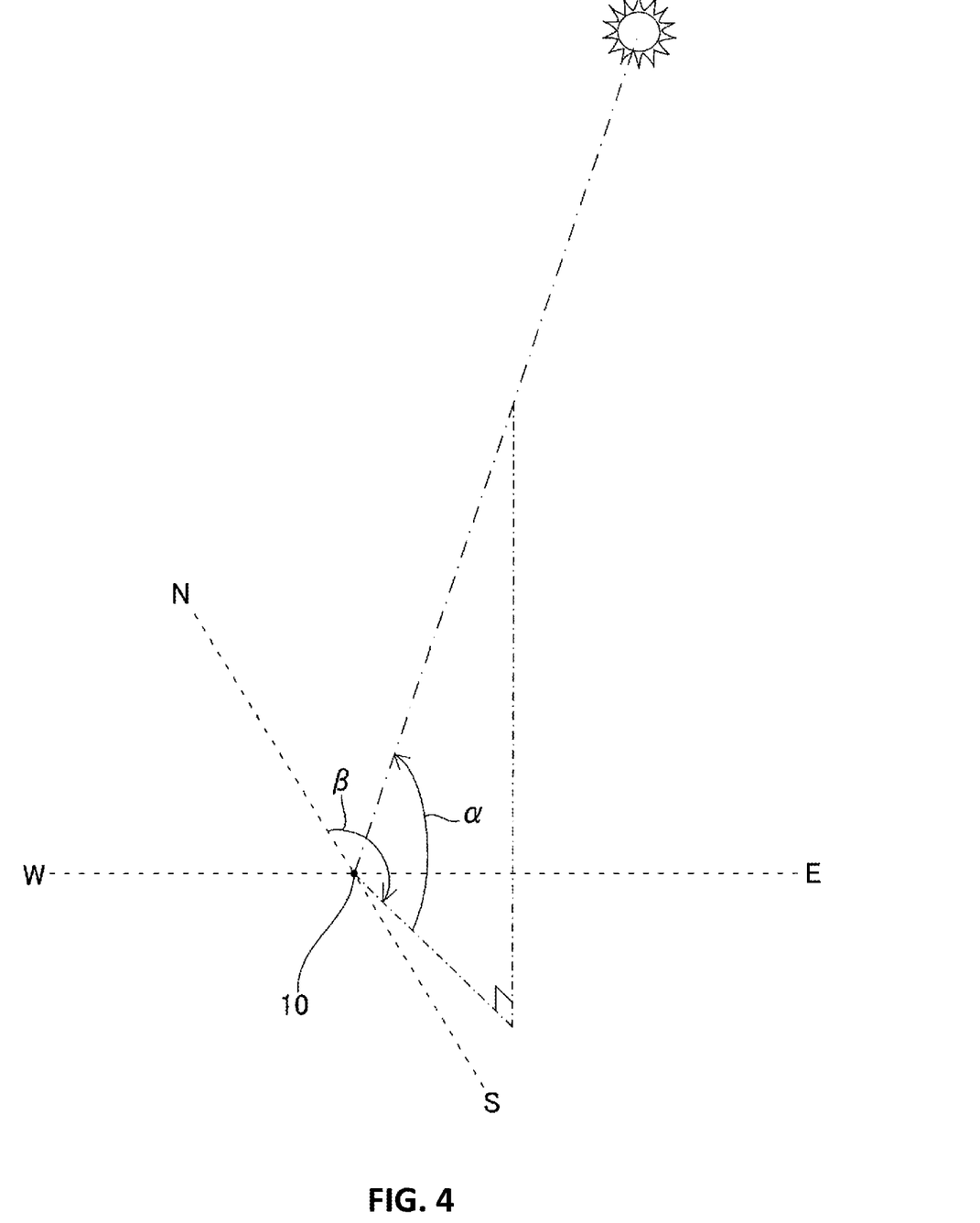
FIG. 4 is an illustration of a sun position in elevation and orientation.
Figure 5:
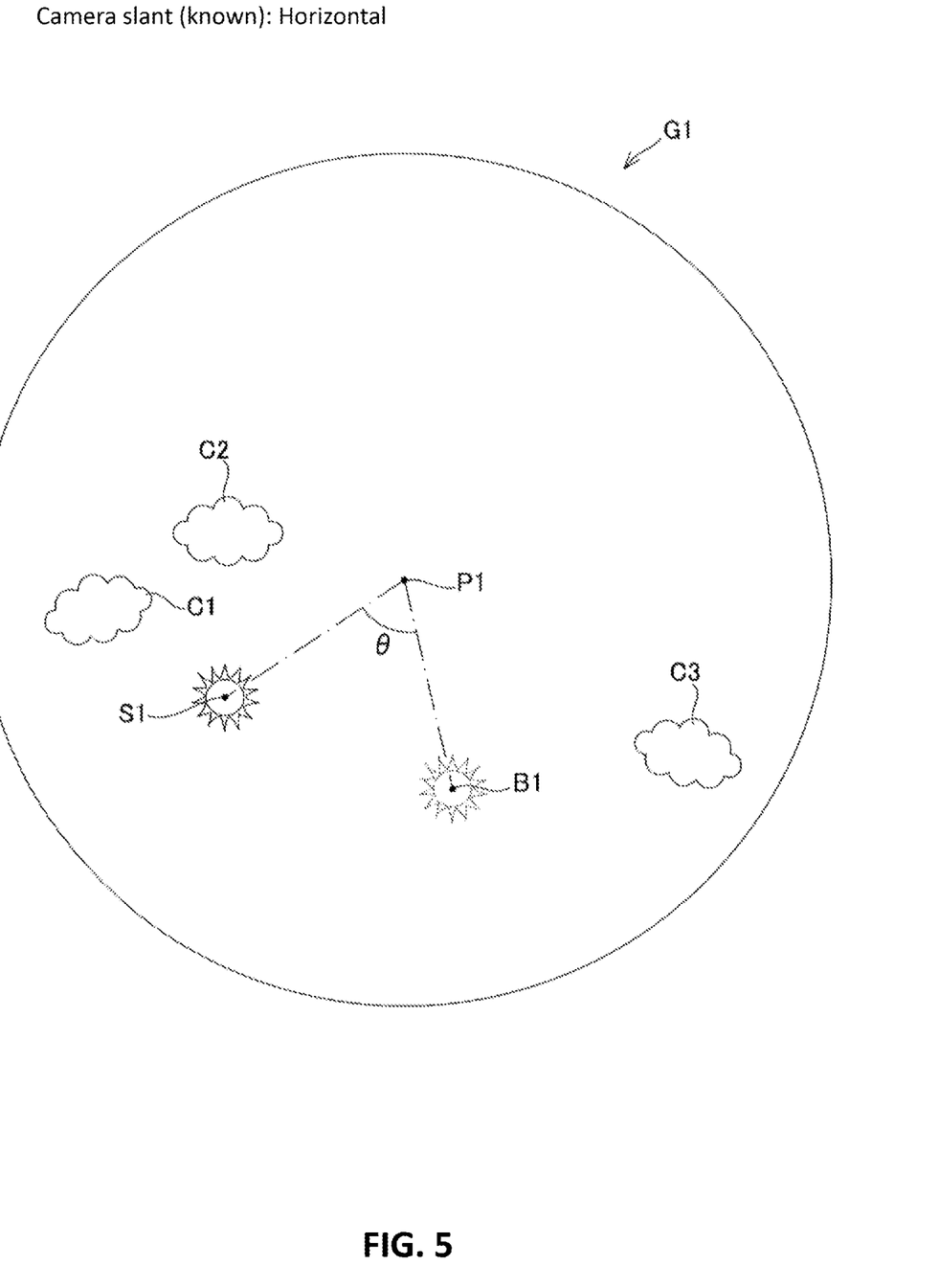
FIG. 5 is an illustration of a comparison of the photographed sun position and the reference sun position in the whole-sky image of the first embodiment.

The reference sun position acquisition module 15 shown in FIG. 1 calculates a reference sun position indicating the position of the sun determined based on the photographing date and time and position information (latitude and longitude). It is known that the position (elevation angle α and orientation angle β) of the sun can be determined based on the photographing date and time and position information (latitude and longitude) by using astronomy. The reference sun position may be expressed in the manner shown in FIG. 4 or in the manner shown in FIG. 5. The reference sun position shown in FIG. 4 is expressed by an elevation angle α and an orientation angle β with respect to a reference orientation (for example, north) with the photographing position where the camera 10 is installed as a center. The reference sun position B1 shown in FIG. 5 is the position of the sun in the whole-sky image G1 when the camera 10 is horizontal and the camera 10 is oriented in a predetermined direction. The predetermined direction is, for example, a desired orientation in which the bottom side of the photographed image G1 is south. In this embodiment, the expression at the reference sun position B1 in the whole-sky image G1 shown in FIG. 5 is adopted.

The preset camera information acquisition module 16 shown in FIG. 1 acquires known camera information of the camera 10. In this embodiment, a known slant of the camera 10 is acquired. As shown in FIG. 1, the preset camera information acquisition module 16 may acquire data on slant from the known camera information stored in the storage 1a, or may acquire data on slant from the camera 10. All the cameras 10 have the same slant.

The camera information identification module 17 shown in FIG. 1 determines an unknown direction of the camera 10 based on the known slant of the camera 10, the photographed sun position S1, and the reference sun position B1. As shown in FIG. 5, the camera information identification module 17 compares the photographed sun position S1 with the reference sun position B1 by using the known slant (horizontal) of the camera 10 to determine the unknown orientation of the camera 10. Specifically, as shown in the figure, the camera information identification module 17 determines the photographed sun position S1 when the camera 10 is horizontal by using the known slant of the camera 10, and determines the unknown orientation of the camera 10 by comparing the determined photographed sun position S1 with the reference sun position B1. In the example of FIG. 5, since the camera 10 is originally installed horizontally, the photographed sun position S1 in the image G1 captured by the camera 10 can be used as it is. An example in which the camera 10 is not horizontal will be described below using the example of FIG. 6. In FIG. 5, the difference θ between the orientational angles of the photographed sun position S1 and the reference sun position B1 is determined, whereby it is determined that the orientational angle of the camera 10 is deviated from a predetermined orientational angle (desired orientation).

In the example of FIGS. 3-5, the photographed sun position S1 and the reference sun position B1 show the position of the sun in the whole-sky image G1 photographed together, and both positions are compared in the image, but the present invention is not limited to this. For example, (1) an angle error θ with respect to a predetermined orientation (desired orientation) of the orientation of the camera 10 may be calculated by comparing the photographed sun position S1 indicating the position of the sun in the image with the reference sun position indicated by the elevation angle α and the orientation angle β. (2) The angle error θ may be calculated by converting the photographed sun position S1 in the image G1 into the photographed sun position indicated by the elevation angle α and the orientation angle β and comparing the converted photographed sun position with the reference sun position indicated by the elevation angle α and the orientation angle β. (3) The angle error θ may be calculated by comparing the photographed sun position indicated by the elevation angle α and the orientation angle β with the reference sun position B1 in the whole-sky image G1.

In the above processing, although the orientation (angle error θ) of the camera 10 is calculated using one image G1, in order to improve the accuracy of determining the orientation (angle error θ), the following structure is preferable. That is, the image acquisition module 11 acquires a plurality of images G1. Preferably, the camera information identification module 17 calculates the angle error θ with respect to the predetermined orientation (desired orientation) of the camera 10 by using an average of a difference (angle error θ) between the photographed sun position S1 and the reference sun position B1 in each image of the plurality of images G1. Alternatively, the camera information identification module 17 may calculate the angle error θ by comparing the trajectory of the photographed sun position S1 in each image G1 with the trajectory of the reference sun position B1 in each image G1.

Figure 6:
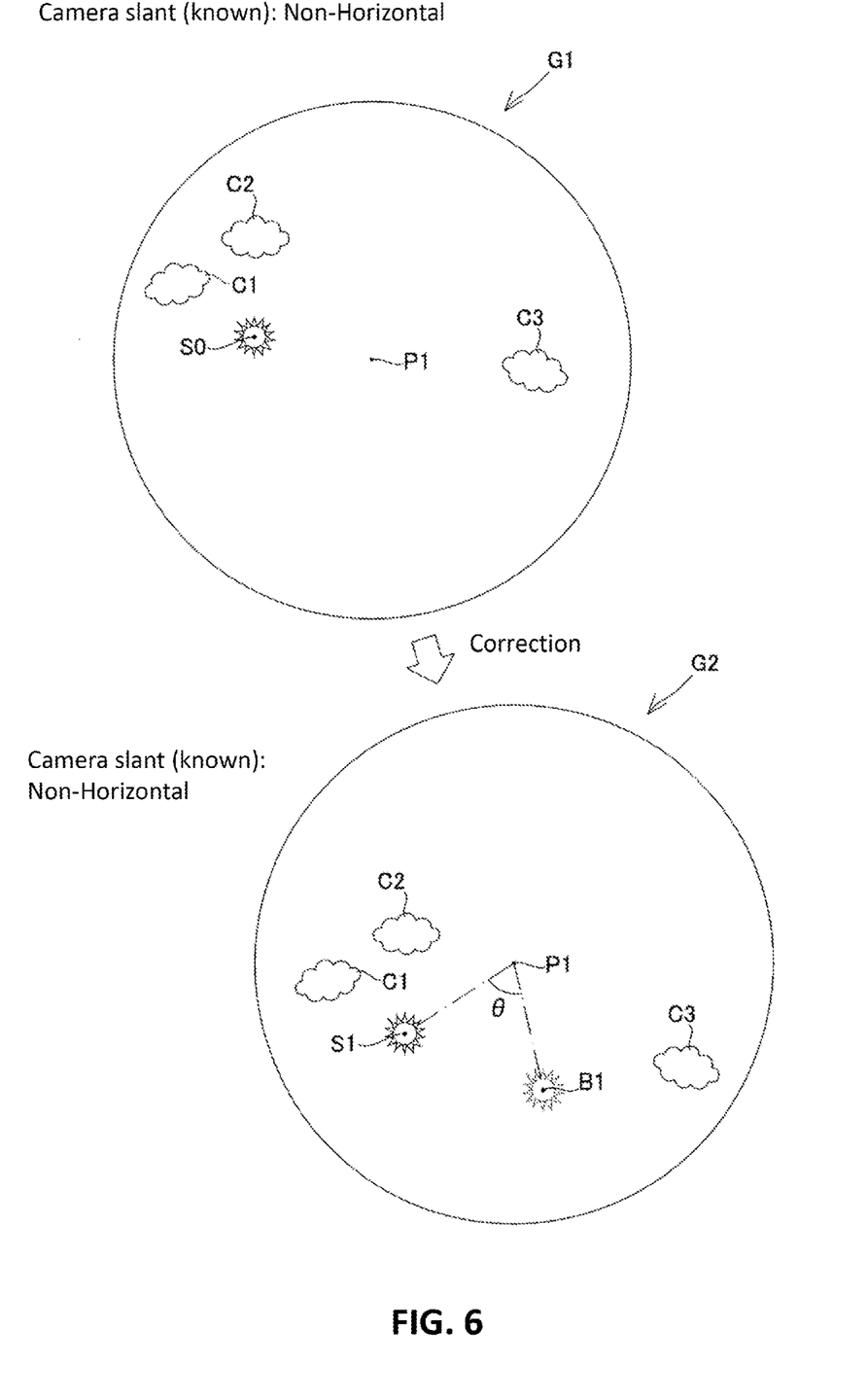
FIG. 6 is an illustration of the orientation determination in the case where the slant is non-horizontal and known.

Here, the processing when the known slant of the camera 10 is not horizontal will be described. As shown in FIG. 6, the photographing position acquisition module 13 acquires a photographed sun position S0 from the image G1 acquired by the image acquisition module 11. The slant of the camera 10 for photographing the image G1 is not horizontal but is determined by a roll angle and a pitch angle. Next, the camera information identification module 17 determines the photographed sun position S1 when the camera 10 is horizontal by using the known slant of the camera 10. Here, the photographed sun position S0 in the image G1 determined by the sun position determination module 14 is corrected to the photographed sun position S1 when the camera 10 is horizontal. In FIG. 6, not only the photographed sun position is corrected (S0 to S1), but also the photographed image G1 is corrected to an image G2 photographed in the horizontal state by the camera 10. Thereafter, as described with reference to the example of FIG. 5, the camera information identification module 17 compares the corrected photographed sun position S1 with the reference sun position B1 to determine an unknown orientation of the camera 10.

Figure 7:
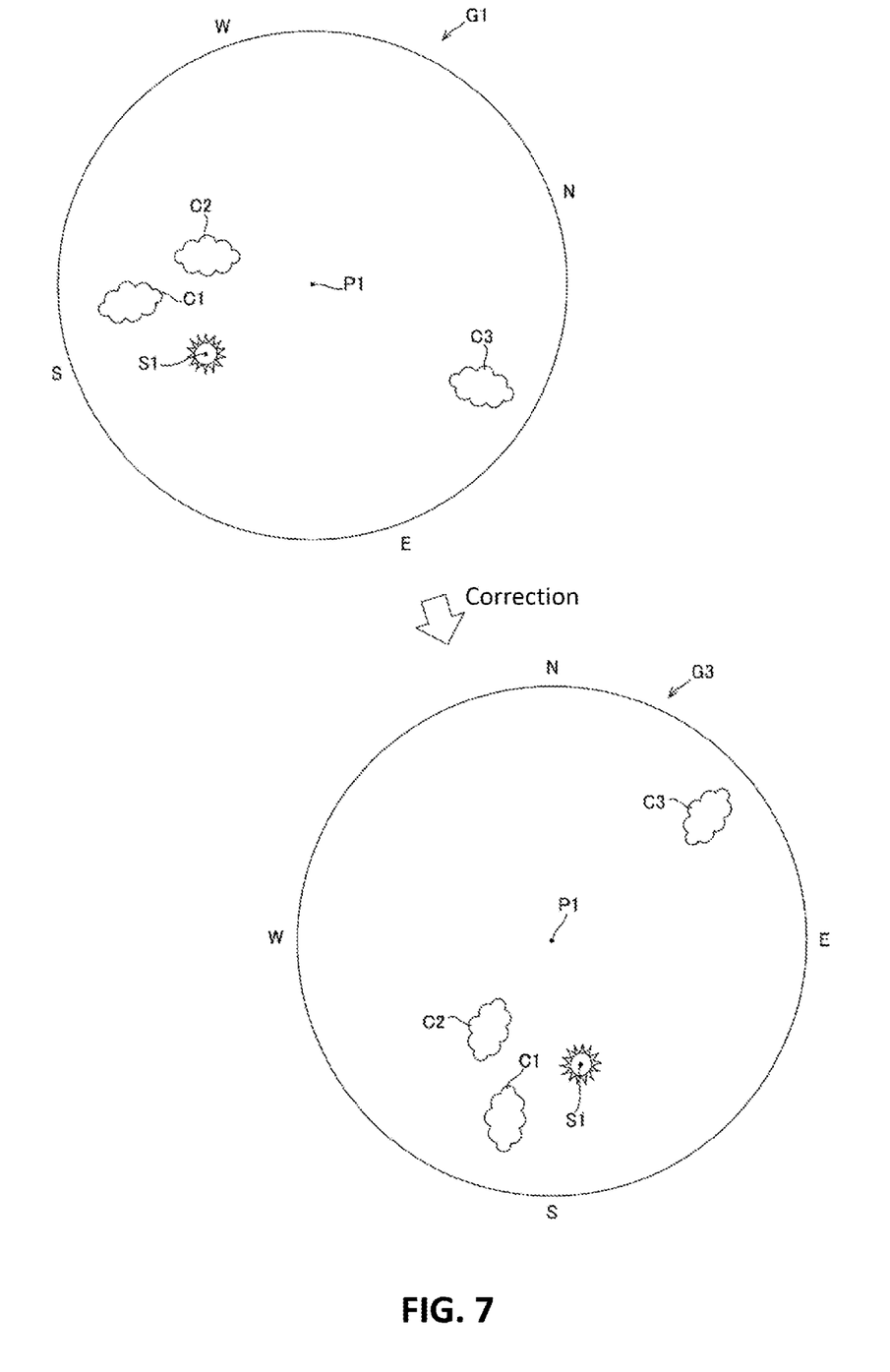
FIG. 7 is a diagram illustrating correction of an image taken by a camera according to the first embodiment.
Figure 8:
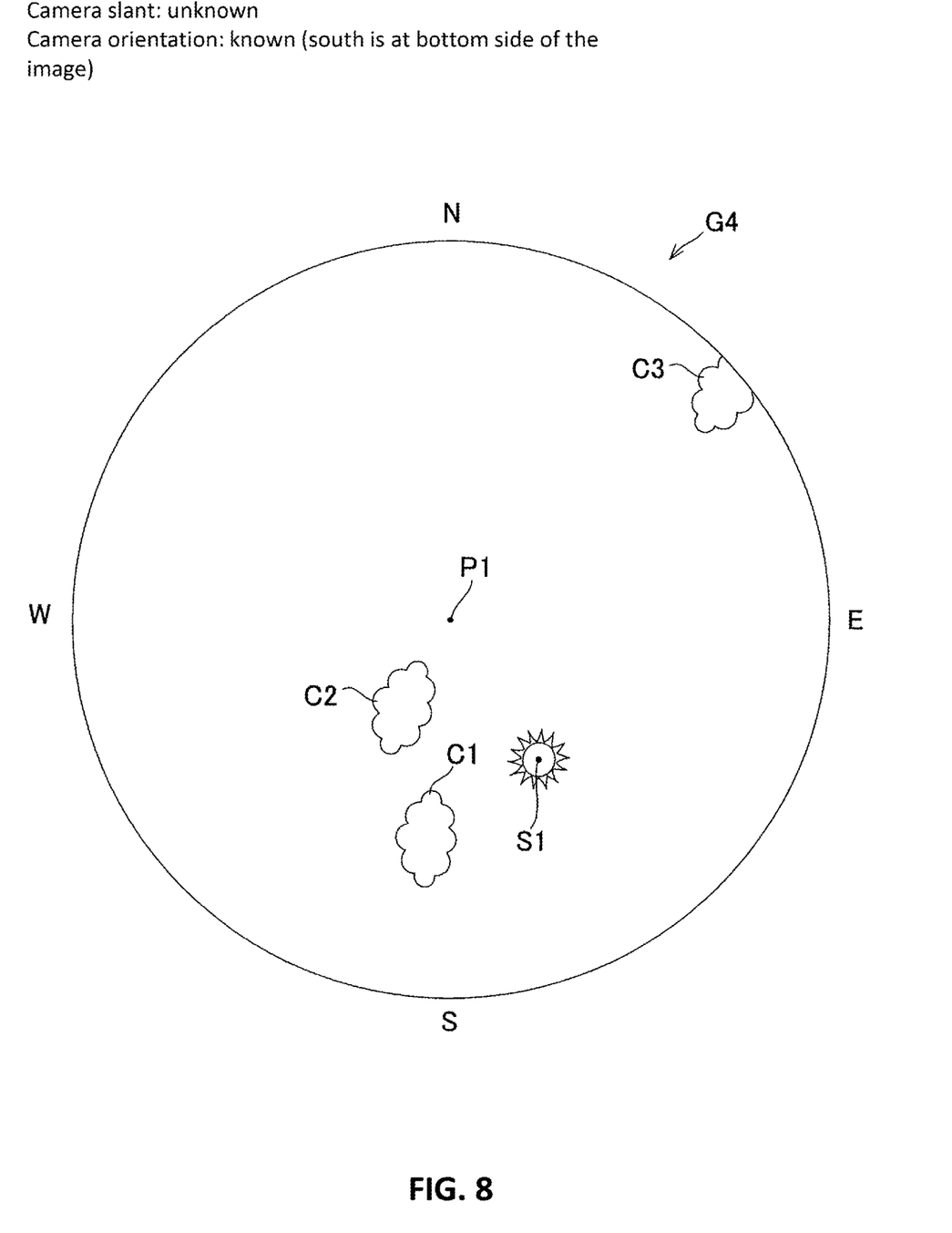
FIG. 8 is an illustration of an image of the sky taken by a camera of known orientation in the second embodiment.

As shown in FIG. 1, the information processing device 1 may be provided with an image correction module 18. The image correction module 18 can be omitted. On the basis of the camera information (orientation or slant) determined by the camera information identification module 17, the image correction module 18 corrects the image G1 acquired by the image acquisition module 11 as shown in FIG. 7 to an image G3 photographed when the camera 10 has a predetermined orientation (desired orientation) and a predetermined slant. In FIG. 7, correction is performed so that the bottom side of the image G3 becomes, for example, the south. If the image correction module 18 is provided, when images from the plurality of cameras 10 separated from each other are acquired and clouds or the like are observed, the orientation of the images from each camera can be matched, and the observation accuracy can be improved.

As shown in FIG. 1, an error information output module 19 may be provided in the information processing device 1. The error information output module 19 can be omitted. The error information output module 19 outputs error information on the orientation or slant of the camera 10 based on the camera information (orientation or slant) determined by the camera information identification module 17. Output methods include display on a display, audio output from a speaker, output of data including error information, and transmission.

Figure 2:
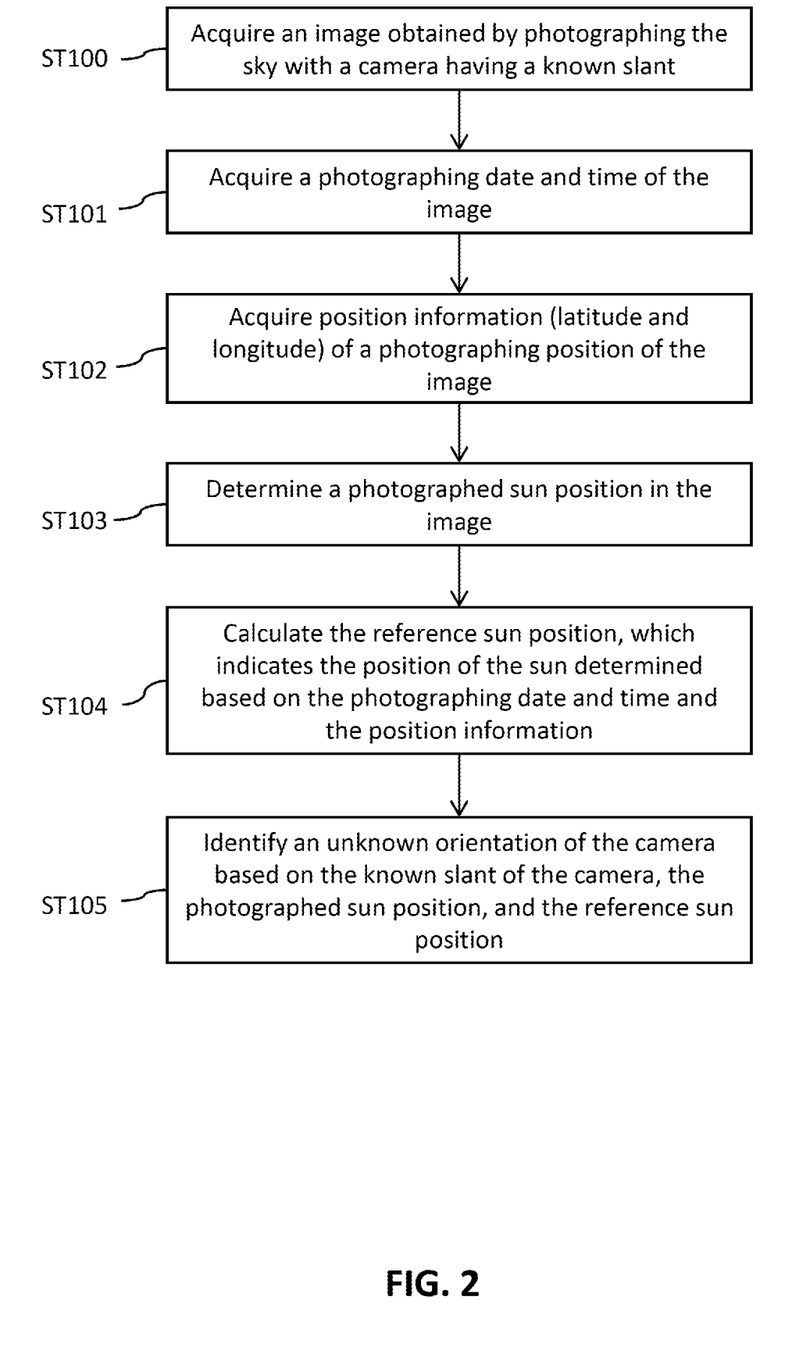
FIG. 2 is a flow chart executed by the information processing device of the first embodiment.

An information processing method executed by the system 1 will be described with reference to FIG. 2.

First, in step ST100, the image acquisition module 11 acquires an image G1 obtained by photographing the sky with a camera 10 whose slant is known. Next, in step ST101, the photographing date/photographing time stamp acquisition module 12 acquires a photographing date and time of the image G1. In step ST102, the photographing position acquisition module 13 acquires position information of a photographing position of the image G1. Steps ST101 and ST102 are out of order before step ST104. In step ST103, the sun position determination module 14 determines a photographed sun position S1 indicating the sun position in the image G1. Step ST103 can be executed after step ST100. In step ST104, the reference sun position acquisition module 15 calculates a reference sun position B1 indicating the position of the sun determined based on the photographing date and time and the position information. In the next step ST105, the camera information identification module 17 determines an unknown orientation of the camera 10 based on the known slant of the camera 10, the photographed sun position S1, and the reference sun position B1.

The information processing device 1 of the first embodiment specifies the orientation of the camera 10 based on the image G1 photographed by the camera 10 whose slant is known. On the other hand, the information processing device 1 of the second embodiment specifies the slant of the camera 10 based on the image G4 taken by the camera 10 having a known orientation. The block diagram of the information processing device 1 of the second embodiment is the same as that of FIG. 1.

As shown in FIG. 1, the preset camera information acquisition module 16 of the second embodiment acquires the known orientation of the camera 10. As shown in FIG. 1, the information on the orientation of the camera 10 may be stored in the storage 1a as known camera information, or data on the orientation may be acquired from the camera 10.

The image acquisition module 11 shown in FIG. 1 acquires an image G4 taken by the camera 10 having a known orientation. In the example shown in FIG. 7, the image G4 photographed from the camera 10 installed so that the bottom side of the image G4 becomes the south direction is acquired.

The reference sun position acquisition module 15 shown in FIG. 1 calculates the reference sun position B1 indicating the position of the sun determined based on the photographing date and time and the position information (latitude and longitude), as in the first embodiment. FIG. 7, like FIG. 5, illustrates the reference sun position B1, which is the position of the sun in the whole-sky image G1 when the camera 10 is horizontal and the camera 10 is oriented in a predetermined direction.

Figure 9:
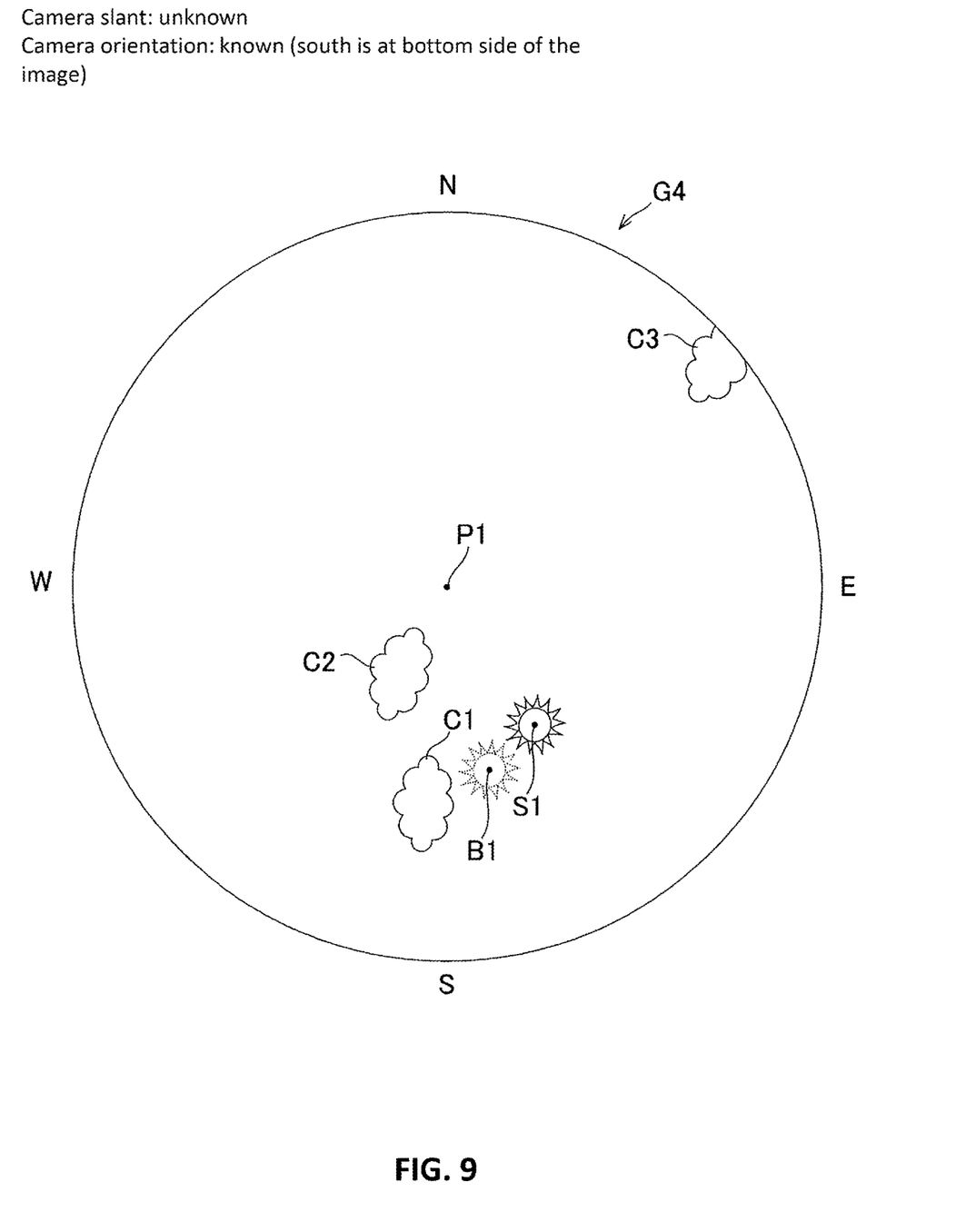
FIG. 9 is an illustration of a comparison of the photographed sun position and the reference sun position in the whole-sky image of the first embodiment.

The camera information identification module 17 shown in FIG. 1 determines an unknown slant of the camera 10 based on the known orientation of the camera 10, the photographed sun position S1, and the reference sun position B1. In the example of FIG. 9, the camera information identification module 17 determines the photographed sun position S1 when the camera 10 faces the reference orientation (direction in which the bottom side of the image is the south) using the known orientation of the camera, and compares the determined photographed sun position S1 with the reference sun position B1 to determine the unknown slant of the camera 10. In FIG. 9, the unknown slant (Roll angle and pitch angle) of the camera 10 is calculated based on a distance and direction between the photographed sun position S1 and the reference sun position B1.

In addition, the functions and processes described in the first embodiment can be applied to the second embodiment as they are, except for the difference that the known information of the camera 10 is the orientation and the unknown information is the slant.

For example, the image correction module 18 corrects the image G4 acquired by the image acquisition module 11 based on the camera information (slant) determined by the camera information identification module 17 into an image photographed when the camera 10 is at a predetermined slant and a predetermined orientation. The error information output module 19 outputs error information on the slant of the camera 10 with respect to the predetermined slant based on the camera information (slant) determined by the camera information identification module 17.

Figure 10:
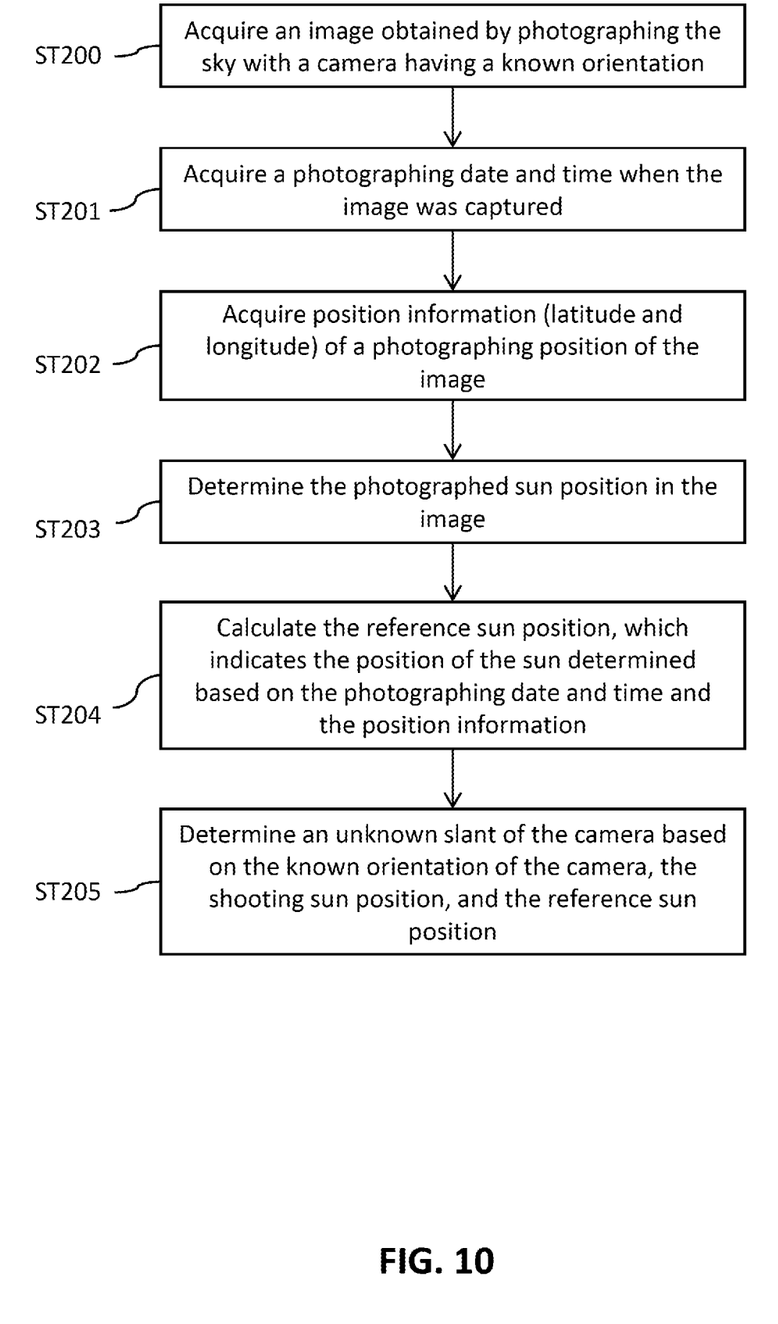
FIG. 10 is a flowchart executed by the information processing device of the second embodiment.

An information processing method executed by the information processing device 1 of the second embodiment will be described with reference to FIG. 10.

First, in step ST200, the image acquisition module 11 acquires an image G4 obtained by photographing the sky with a camera 10 having a known orientation. Next, in step ST201, the photographing date/photographing time stamp acquisition module 12 acquires a photographing date and time of the image G4. In step ST202, the photographing position acquisition module 13 acquires position information of a photographing position of the image G4. Steps ST201 and ST202 are out of order before step ST204. In step ST203, the sun position determination module 14 determines the photographed sun position S1 indicating the sun position in the image G4. Step ST203 can be executed after step ST200. In step ST204, the reference sun position acquisition module 15 calculates the reference sun position B1 indicating the position of the sun determined based on the photographing date and time and the position information. In the next step ST205, the camera information identification module 17 determines an unknown slant of the camera 10 based on the known orientation of the camera 10, the photographed sun position S1, and the reference sun position B1.

As described above, the information processing device 1 according to the first or second embodiment includes:
  an image acquisition module 11 configured to acquire an image (G1, G4) obtained by photographing the sky with a camera 10 having a known orientation and/or slant;
  a photographing time stamp acquisition module 12 configured to acquire a photographing date and time of the image (G1, G4);
  a photographing position acquiring module 13 configured to acquire position information of a photographing position of the image (G1, G4);
  a sun position determination module 14 configured to determine a photographed sun position S1 indicating a sun position in the image (G1, G4);
  a reference sun position acquisition module 15 configured to calculate a reference sun position B1 indicating a position of the sun determined based on the photographing date and time and the position information; and
  a camera information identification module 17 configured to determine any one of unknown orientation and slant of the camera 10, based on any one of known slant and orientation of the camera 10, the photographed sun position S1, and the reference sun position B1.

An information processing method according to the first or second embodiment includes:
  acquiring an image (G1, G4) obtained by photographing the sky with a camera 10 having a known orientation and/or slant (ST100, ST200);
  acquiring a photographing date and time of the image (G1, G4) (ST101, ST201);
  acquiring positional information of a photographing position of the image (G1, G4) (ST102, ST202),
  determining a photographed sun position S1 indicating a sun position in an image (G1, G4) (ST103, ST203);

calculating a reference sun position B1 indicating the position of the sun determined based on the photographing date and time and the position information (ST104, ST204); and determining any one of the unknown orientation and slant of the camera 10 based on any one of the known orientation and slant of the camera 10, the photographed sun position S1, and the reference sun position B1 (ST105, ST205).

According to this configuration, if any one of the orientation and slant of the camera 10 is known, any one of the unknown orientation and slant of the camera can be determined based on the photographing date and time, the positional information of the photographing position (latitude and longitude), and the sun position reflected in the image G1 or G4. Therefore, it becomes unnecessary to align the orientation or the slant when the camera 10 is installed, and the slant or the orientation of the camera 10 can be determined without providing an attitude sensor or an orientation sensor.

As in the first embodiment, the slant of the camera 10 is known, and the camera information identification module 17 preferably uses the known slant of the camera 10 to compare the photographed sun position S1 with the reference sun position B1 to determine an unknown orientation of the camera 10.

According to this configuration, the unknown orientation of the camera 10 can be determined.

As in the first embodiment, the image G1 is a whole-sky image captured by the whole-sky camera 10, the reference sun position B1 indicates the sun position in the whole-sky image when the camera 10 is horizontal and the camera 10 is directed in a predetermined direction, and the camera information identification module 17 preferably determines the photographed sun position S1 when the camera 10 is horizontal by using the slant of the camera 10, and compares the determined photographed sun position S1 with the reference sun position B1 to determine the unknown orientation of the camera 10.

According to this configuration, since the whole-sky image includes information of orientation angle and elevation angle, and since the photographed sun position S1 and the reference sun position B1 are compared when the camera 10 is horizontal and directed in the predetermined direction, the unknown orientation of the camera can be determined by processing the coordinates in the image G1 without converting them into other coordinate systems than the image.

As in the first embodiment, it is preferable that the image acquisition module 11 acquires the plurality of images G1, and the camera information identification module 17 determines the unknown orientation of the camera 10 by using the average of the difference between the photographed sun position S1 and the reference sun position B1 in the plurality of images G1.

According to this configuration, since the average of the difference between the photographed sun position S1 and the reference sun position B1 is used, it becomes resistant to noise and the accuracy of determining the orientation can be improved.

As in the second embodiment, the orientation of the camera 10 is known, and the camera information identification module 17 preferably uses the orientation of the camera 10 to compare the photographed sun position S1 with the reference sun position B1 to determine an unknown slant of the camera 10.

According to this configuration, the unknown slant of the camera 10 can be determined.

As in the second embodiment, the image G4 is a whole-sky image captured by a whole-sky camera, and the reference sun position B1 indicates the sun position in the whole-sky image when the camera 10 is horizontal and the camera 10 is facing a predetermined direction, and the camera information identification module 17 preferably uses the direction of the camera 10 to determine the photographed sun position S1 when the camera 10 is facing the predetermined direction, and compares the determined photographed sun position S1 with the reference sun position B1 to determine the unknown slant of the camera 10.

According to this configuration, since the whole-sky image includes information of orientation angle and elevation angle, and since the photographed sun position S1 and the reference sun position B1 are compared when the camera 10 is horizontal and directed in the predetermined direction, the unknown slant of the camera can be determined by processing the coordinates in the image G4 without being converted into a coordinate system other than the image.

As in the second embodiment, it is preferable that the image acquisition module 11 acquires the plurality of images G4, and the camera information identification module 17 determines the unknown slant of the camera 10 by using the average of the difference between the photographed sun position S1 and the reference sun position B1 in the plurality of images G4.

According to this configuration, since the average of the difference between the photographed sun position S1 and the reference sun position B1 is used, it becomes resistant to noise and the accuracy of determining the slant can be improved.

The program according to the present embodiment is a program for causing a computer to execute the method. The computer readable temporary recording medium according to the present embodiment stores the program.

Although the embodiments of the present disclosure have been described above with reference to the drawings, it should be understood that the specific configuration is not limited to these embodiments. The scope of the present disclosure is set forth not only by the description of the embodiments described above, but also by the claims, and further includes all modifications within the meaning and scope of the claims.

For example, the order of execution of each process, such as operations, procedures, steps, and steps, in the devices, systems, programs, and methods illustrated in the claims, the description, and the drawings may be implemented in any order, unless the output of the previous process is used in a subsequent process. Even if the flow in the claims, the description, and the drawings is explained by using "First of all,", "Next", etc., it does not mean that it is essential to carry out in this order.

Each module 12-17 shown in FIG. 1 is implemented by executing a predetermined program by one or multiple processor(s), but each module may be constituted by a dedicated memory or a dedicated circuit.

In the information processing system (device) 1 of the above embodiment, the respective modules 11-19 are implemented on the processor 1b of one computer, but the respective modules 11-19 may be distributed and implemented on a plurality of computers or clouds. That is, the method may be performed on one or more processors.

The structures employed in the above embodiments may be employed in any other embodiment. In FIG. 1, each module 11-19 is implemented for convenience of explanation, but a part of them can be omitted optionally. For example, there is an embodiment in which each module 11-17 is implemented.

The specific configuration of each part is not limited to the above-described embodiment, and various modifications can be made without departing from the scope of the present disclosure.

LIST OF REFERENCE CHARACTERS

1 Information Processing System (Device)
11 Image Acquisition Module
12 Photographing Time Stamp Acquisition Module
13 Photographing Position Acquisition Module
14 Sun Position Determination Module
15 Reference Sun Position Acquisition Module
16 Preset Camera (Slant) Information Acquisition Module
17 Camera (Orientation) Information Identification Module
18 Image Correction Module
19 Error Information Output Module It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An information processing device, comprising:
processing circuitry configured to:
acquire an image obtained by photographing a sky with a camera having a known slant defined by a roll angle and a pitch angle;
acquire a photographing date and time of the image;
acquire position information of a photographing position of the image;
determine a photographed sun position indicating a sun position in the image;
calculate a reference sun position indicating a position of the sun determined based on the photographing date and time and the position information;
determine an unknown orientation of the camera based on the known slant of the camera, the photographed sun position, and the reference sun position.

2. The information processing device according to claim 1, wherein
the processing circuitry is further configured to compare the photographed sun position with the reference sun position by using the known slant of the camera to determine the unknown orientation of the camera.

3. The information processing device according to claim 2, wherein
the camera is a whole-sky camera;
the image is a whole-sky image captured by the whole-sky camera;
the reference sun position indicates the sun position in the whole-sky image when the camera is horizontal and the camera is oriented in a predetermined direction; and
the processing circuitry is further configured to:
determine the photographed sun position when the camera is horizontal by using the known slant of the camera, and
determine the unknown orientation of the camera by comparing the determined photographed sun position with the reference sun position.

4. The information processing device according to claim 3, wherein
the processing circuitry is further configured to:
acquire a plurality of images; and
determine the unknown orientation of the camera by using an average of a difference between a photographed sun position and the reference sun position in the plurality of images.

5. The information processing device according to claim 1, wherein
the processing circuitry is further configured to correct the image acquired by the processing circuitry based on the unknown orientation of the camera determined by the processing circuitry to an image to be photographed when the camera has a predetermined orientation and a predetermined slant.

6. The information processing device according to claim 5, wherein
the processing circuitry is further configured to output error information with respect to the predetermined orientation based on the unknown orientation of the camera determined by the processing circuitry.

7. The information processing device according to claim 1, wherein
the camera is a whole-sky camera using a fisheye lens, and
the image is a whole-sky image captured by the whole-sky camera.

8. An information processing method, comprising:
acquiring an image obtained by photographing a sky with a camera having a known slant defined by a roll angle and a pitch angle;
acquiring a photographing date and time of the image;
acquiring position information of a photographing position of the image;
determining a photographed sun position indicating a sun position in the image;
calculating a reference sun position indicating a position of the sun determined based on the photographing date and time and the position information; and
determining an unknown orientation of the camera based on the known slant of the camera, the photographed sun position, and the reference sun position.

9. The information processing method of claim 8, wherein
the information processing method compares the photographed sun position with the reference sun position by using the known slant of the camera to determine the unknown orientation of the camera.

10. The information processing method of claim 9, wherein
the camera is a whole-sky camera;
the image is a whole-sky image captured by the whole-sky camera;
the reference sun position indicates the sun position in the whole-sky image when the camera is horizontal and the camera is oriented in a predetermined direction; and
the information processing method determines the photographed sun position when the camera is horizontal by using the known slant of the camera, and determines the unknown orientation of the camera by comparing the determined photographed sun position with the reference sun position.

11. The information processing method of claim 10, wherein
a plurality of images are acquired; and
the information processing method determines the unknown orientation of the camera by using an average of a difference between a photographed sun position and the reference sun position in the plurality of images.

12. The information processing method according to claim 8, further comprising:
correcting the acquired image based on the determined unknown orientation of the camera to an image to be photographed when the camera has a predetermined orientation and a predetermined slant.

13. The information processing method according to claim 12, further comprising:
outputting error information with respect to the predetermined orientation based on the determined unknown orientation of the camera.

14. An information processing device, comprising:
processing circuitry configured to:
acquire an image obtained by photographing a sky with a camera having a known orientation defined by a yaw angle;
acquire a photographing date and time of the image;
acquire position information of a photographing position of the image;
determine a photographed sun position indicating a sun position in the image;
calculate a reference sun position indicating a position of the sun determined based on the photographing date and time and the position information; and
determine an unknown slant of the camera based on the known orientation of the camera, the photographed sun position, and the reference sun position.

15. The information processing device according to claim 14, wherein
the processing circuitry is further configured to compare the photographed sun position with the reference sun position by using the known orientation of the camera to determine the unknown slant of the camera.

16. The information processing device according to claim 15, wherein
the camera is a whole-sky camera;
the image is a whole-sky image captured by the whole-sky camera;
the reference sun position indicates the sun position in the whole-sky image when the camera is horizontal and the camera is oriented in a predetermined direction; and
the processing circuitry is further configured to:
determine the photographed sun position when the camera faces the predetermined direction by using the known orientation of the camera, and
determine the unknown slant of the camera by comparing the determined photographed sun position with the reference sun position.

17. The information processing device according to claim 16, wherein
the processing circuitry is further configured to:
acquire a plurality of images; and
determine the unknown slant of the camera by using an average of a difference between the photographed sun position and the reference sun position in the plurality of images.

18. An information processing method, comprising:
acquiring an image obtained by photographing a sky with a camera having a known orientation defined by a yaw angle;
acquiring a photographing date and time of the image;
acquiring position information of a photographing position of the image;
determining a photographed sun position indicating a sun position in the image;
calculating a reference sun position indicating a position of the sun determined based on the photographing date and time and the position information; and
determining an unknown slant of the camera based on the known orientation of the camera, the photographed sun position, and the reference sun position.

19. The information processing method of claim 18, wherein
the information processing method compares the photographed sun position with the reference sun position by using the known orientation of the camera to determine the unknown slant of the camera.

20. The information processing method of claim 19, wherein
the camera is a whole-sky camera;
the image is a whole-sky image captured by the whole-sky camera;
the reference sun position indicates the sun position in the whole-sky image when the camera is horizontal and the camera is oriented in a predetermined direction; and
the information processing method determines the photographed sun position when the camera faces the predetermined direction by using the known orientation of the camera, and determines the unknown slant of the camera by comparing the determined photographed sun position with the reference sun position.

21. The information processing method according to claim 20, wherein
a plurality of images are acquired; and
the information processing method determines the unknown slant of the camera by using an average of a difference between the photographed sun position and the reference sun position in the plurality of images.

* * * * *